July 12, 1960
J. PICKLES
2,944,436
NON-JAMMING ACTUATED SCREW AND NUT COMBINATION
Filed Jan. 20, 1958
2 Sheets-Sheet 1
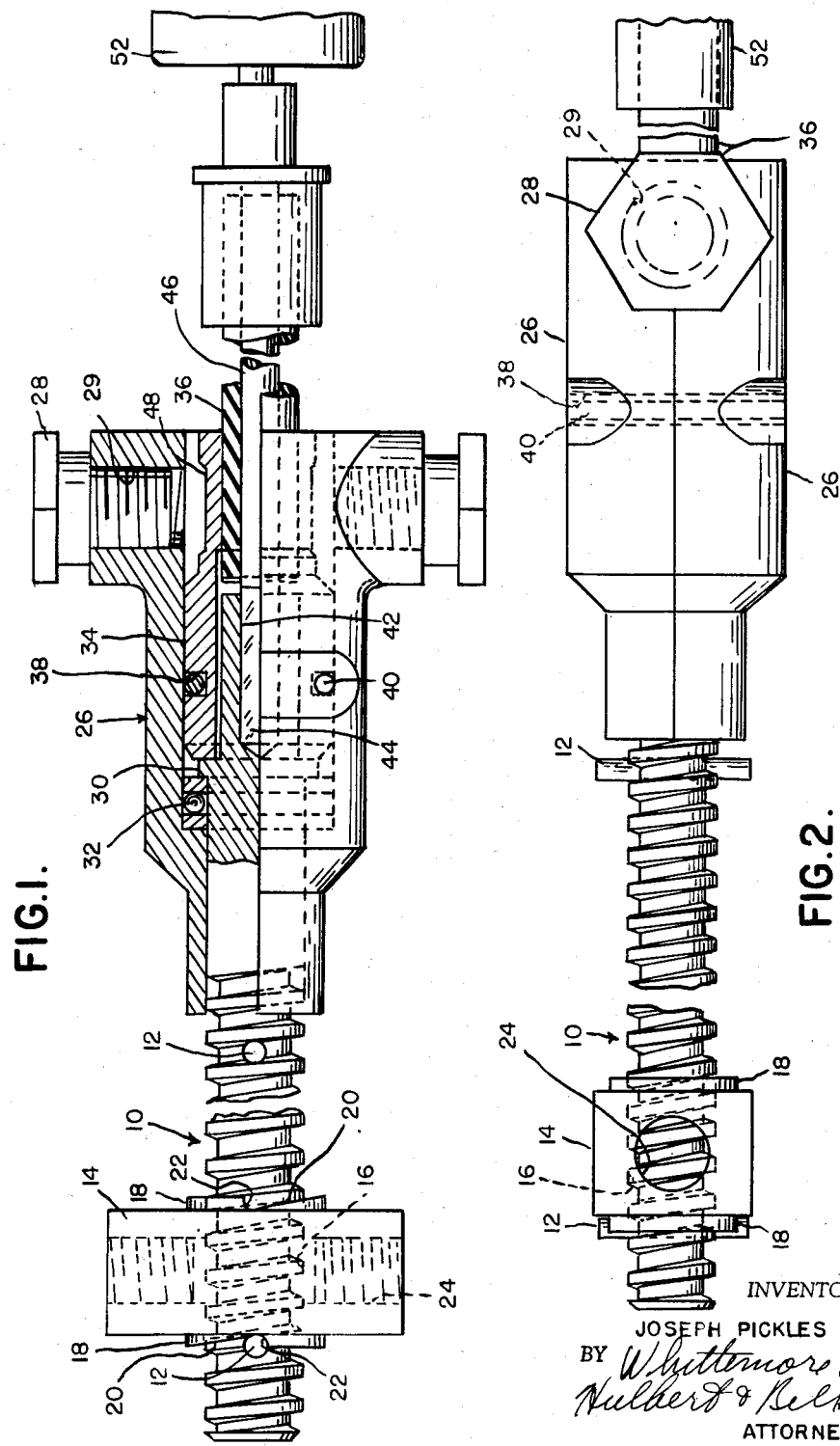
INVENTOR.
JOSEPH PICKLES
BY Whittemore,
Hulbert & Belknap
ATTORNEYS July 12, 1960     J. PICKLES     2,944,436
NON-JAMMING ACTUATED SCREW AND NUT COMBINATION
Filed Jan. 20, 1958     2 Sheets-Sheet 2

INVENTOR.
JOSEPH PICKLES
BY Whittemore,
Hulbert & Belknap
ATTORNEYS

United States Patent Office 2,944,436
Patented July 12, 1960

2,944,436

NON-JAMMING ACTUATED SCREW AND NUT COMBINATION

Joseph Pickles, Dearborn, Mich., assignor to Ferro Stamping Company, Detroit, Mich., a corporation of Michigan Filed Jan. 20, 1958, Ser. No. 710,132

7 Claims. (Cl. 74—424.8)

The present invention relates to a nonjamming actuated screw and nut combination.

There are a great many situations in which the combination of a feed screw and nut may be advantageously used to effect movement of a member. A typical example which is given only for the purpose of illustration, is mechanism for adjusting a seat of an automotive vehicle. Reference is made to Patent No. 2,931,424, which issued to the present applicant and assigned to the same assignee as the present application, for a full disclosure of such a mechanism. In this use of the feed screw and nut combination, as in many others, it is desirable to actuate the combination by means of an electric motor which is controlled to drive the rotatable member of the combination to a limiting position at which position the motor is stalled. In many cases this results in a jamming condition between the nut and screw similar to the condition which exists when a nut is tightened down firmly on a bolted plate for example.

Even if the mechanism associated with the feed screw and nut is designed so that the nut is not permitted to be rotated into frictional engagement with a stationary surface, jamming nevertheless results due to wind-up of actuating mechanism which establishes frictional resistance to motion between the nut and screw. This condition may be sufficiently severe to prevent a reverse actuation of the motor from starting relative rotational movement between the nut and screw since the jamming condition may have been occasioned by full power of the motor plus inertia of the driven parts.

With the foregoing in mind, it is an object of the present invention to provide a feed screw and nut combination characterized by the complete elimination of any possibility of jamming or frictional interlocking between the parts.

More specifically, it is an object of the present invention to provide a feed screw and nut combination having abutment means directly associated therewith adapted to come into engagement to prevent relative rotation, the abutment means having surfaces including portions disposed at an angle greater than a wedging angle to the direction of relative movement between the surfaces upon engagement.

More specifically, it is an object of the present invention to provide a feed screw and nut combination as described in the preceding paragraph in which the abutment surfaces which terminate relative rotation between the feed screw and nut include portions extending generally radially and axially, or in other words, facing generally circumferentially.

It is a feature of the present invention to provide a feed screw and nut combination in which the feed screw is provided with a radially extending abutment and in which the nut is provided with a surface engageable in non-jamming relation therewith, the portion of the nut in advance of the surface being relieved along the line corresponding generally with the helix angle of the threads.

It is a further feature of the present invention to provide a non-jamming nut and screw combination in which either the nut or screw is provided with an abrupt radially extending abutment located in a space between adjacent threads, and in which the other of the members is provided with a thread having an abrupt shoulder at one end engageable in non-jamming relation with the abutment.

Other objects and features of the invention will become apparent as the description proceeds, especially when taken in conjunction with the accompanying drawings, illustrating preferred embodiments of the invention, wherein:

Figure 1 is a plan view partly in section of a feed screw and nut combination constructed in accordance with the present invention.

Figure 2 is an elevation view of the structure shown in Figure 1.

Figure 3:
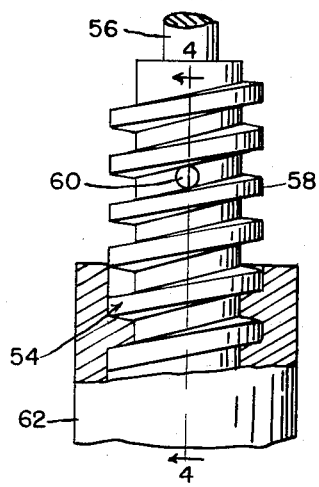
Figure 3 is a fragmentary end view of a feed screw modified in accordance with another embodiment of the present invention.
Figure 4:
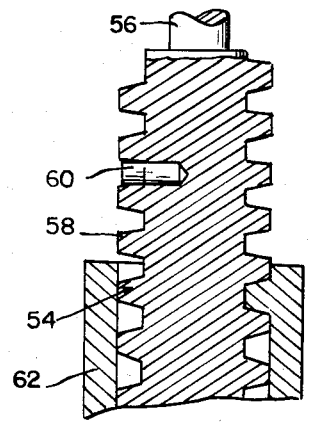
Figure 4 is a sectional view on the line 4—4, Figure 3.

In accordance with the present invention abutment means are provided acting directly between a feed screw and nut which come into direct non-wedging engagement to limit relative rotation between the feed screw and nut. Preferably, a pair of abutment means are provided to limit relative rotational movement between the feed screw and nut in one direction and if desired, a similar pair of abutment means may be provided to limit relative rotational movement between the feed screw and nut in the opposite direction.

Referring first to Figure 1 there is illustrated a typical application of the present invention. An elongated feed screw as indicated at 10 is provided at axially spaced points thereon with diametrically extending pins 12 which extend completely through the feed screw and project radially outwardly beyond the ends thereof as indicated in Figure 2. The nut is indicated at 14 and is provided with an internally threaded opening 16 the threads of which of course cooperate with the threads on the feed screw 10. At opposite ends the nut is provided with short axially extending collars 18 which are relieved as indicated at 20 at an angle corresponding to substantially the helix angle of the threads on the feed screw and nut and terminating in an abutment shoulder 22. The abutment shoulder 22 is designed to come into engagement with a side of an abutment pin 12 in non-wedging, non-jamming relation. This condition requires only that the surfaces of the shoulder 22 and pin 12 are not inclined to the direction of instantaneous motion as they come into engagement at an angle which will produce wedging or jamming. However, as a matter of design, these surfaces are conveniently shaped to include portions which extend generally radially and axially of the nut and screw. This disposition of the engaging surfaces may also be identified as circumferentially facing. With this arrangement it will be observed that upon a limit of movement as determined by the position of the pins 12 being reached, torque applied to the nut or screw has no tendency to produce wedging or jamming but is directly and positively arrested by engagement between the abutting surfaces.

In Figure 1 the nut 14 is indicated as having collars 18 at opposite ends and the screw 10 is illustrated as having a pair of motion limiting abutment pins 12.

It will be appreciated that the purpose of providing the helical relief as indicated at 20 is to permit the direct non-wedging engagement between a pin 12 and an abutment shoulder 22 and is necessary since rotation of the parts is accompanied by relative axial movement.

The nut 14 is illustrated as provided with tapped openings 24 for connection to a suitable actuating device such for example as a vehicle seat. In the present instance the mechanism actuated by the nut 14 therefore serves as a means for preventing rotation of the nut relative to the feed screw. At the same time, the actuating means for the feed screw is mounted to permit rotation of the feed screw and to prevent axial movement thereof. Specifically, the feed screw 10 is mounted for rotation in a two-piece housing indicated generally at 26 having laterally extending pins 28 threaded into openings 29 by means of which the housing 26 may be trunnioned to a stationary support. The feed screw 10 is provided with a radially extending flange 30 engageable at one side with a thrust bearing assembly indicated generally at 32. At the opposite side of the flange 30 there is provided a tubular support member 34 fixed to the end of a flexible tubular casing 36 and provided with an annular groove or channel 38 adapted to receive assembly screws or pins 40 which retain the member 34 in the housing 26 against axial movement. The bottom of the channel 38 is preferably flattened so that the screws or pins 40 engage the flattened bottom surfaces and thus also prevent rotation of the member 34 in the housing 26. The end of the feed screw 10 is provided with a squared recess 42 which receives the squared driving end 44 of a flexible drive cable 46 received within the flexible casing 36. If desired, the inner ends of the pins 28 may be dimensioned to extend into abutment with the reduced portion 48 of the member 34.

The two halves of the housing 26 are retained in assembled relationship by the screws 40.

From the foregoing the operation is believed apparent. The housing 26 is trunnioned to a stationary support by means of the pins 28. One end of the feed screw 10 extends into this housing where it is journaled for rotation but is prevented from moving axially therein. A flexible drive cable is connected in driving relation to the inner end of the feed screw. The nut 14 is mounted in threaded relation on the feed screw between the abutment pins 12 and will be connected to a member to be driven, such for example as an actuating lever of a vehicle seat adjustment mechanism. This member prevents rotation of the nut 14 so that as the feed screw 10 is rotated the nut is caused to move axially of the feed screw. The abutment pins 12 are located in positions corresponding to the desired limits of movement of the member which will be connected to the nut 14. When this limit of movement is reached a shoulder or pair of shoulders 22 on the nut come into direct abutting non-wedging engagement with circumferentially facing surface portions of the pins 12. Thus, further rotation of the feed screw is prevented and the drive means therefor, ordinarily an electric motor as indicated diagrammatically at 52, will stall.

Figure 5:
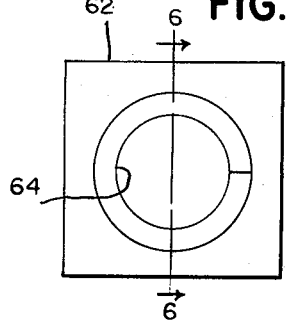
Figure 5 is an end view of a nut cooperable with the screw illustrated in Figures 3 and 4.
Figure 6:
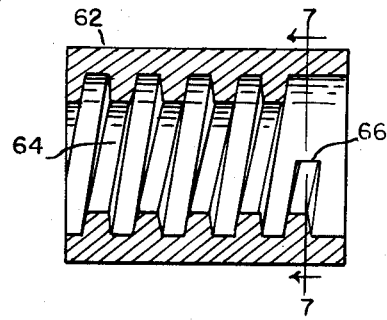
Figure 6 is a sectional view on the line 6—6, Figure 5.
Figure 7:
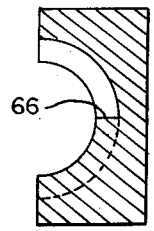
Figure 7 is a sectional view on the line 7—7, Figure 6.

The foregoing constitutes a preferred embodiment of the invention since it involves very simple modifications of a conventional feed screw and nut. However, the invention may be carried out with specifically different constructions as suggested in Figures 3–8. In these figures a portion of a feed screw is indicated at 54 having suitable drive means such as indicated at 56 which may be a flexible driving cable. The feed screw is provided with a continuous thread 58 and at a desired location on the feed screw and intermediate adjacent convolutions of the thread there is provided an abutment pin 60. Mounted on the feed screw 54 is the nut 62 details of which are illustrated in Figures 5–7. The nut 62 is provided with a through opening having a continuous thread 64 therein. Adjacent one end of the nut (and adjacent both ends if a pair of stop pins 60 are provided in axially spaced relation) the thread 64 is terminated abruptly to provide an abutment shoulder 66 adapted to come into engagement with the pin 60 in non-wedging, non-jamming relationship. As illustrated in Figures 5–7 the end of the thread is a flat surface which extends radially and axially of the nut. It will be appreciated of course that the surface need not extend exactly in this direction but it must not depart therefrom by an angle sufficiently large to produce a wedging or jamming engagement with the pin 60. The surface of the shoulder 66 as illustrated in Figures 5–7, may be aptly described as circumferentially facing.

Figure 8:
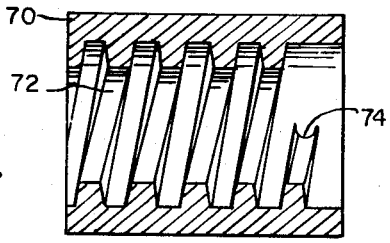
Figure 8 is a view similar to Figure 7 illustrating another embodiment of the invention.

Referring now to Figure 8 there is illustrated a variation of the invention as illustrated in Figures 5–7. In this case the nut 70 is provided with a thread 72 the end of which is terminated abruptly to provide the abutment shoulder 74. In this case the abutment shoulder is concavely shaped to come into surface contact with a circumferentially facing side of an abutment pin 60.

The drawings and the foregoing specification constitute a description of the improved non-jamming actuated screw and nut combination in such full, clear, concise and exact terms as to enable any person skilled in the art to practice the invention, the scope of which is indicated by the appended claims.

What I claim as my invention is:

1. A feed screw and nut combination comprising a feed screw having a fixed abutment located entirely within a thread space thereof and including a generally circumferentially facing abutment surface, said nut having a thread shaped at one end to provide a generally circumferentially facing abutment surface engageable in non-jamming relation with the aforesaid abutment surface of said screw.

2. The combination as defined in claim 1 in which the abutment surface at the end of the thread of said nut is located inwardly from the adjacent end of said nut.

3. The combination as defined in claim 1 in which the abutment of said screw comprises a pin extending radially into said screw between adjacent thread convolutions thereof.

4. The combination as defined in claim 3 in which the abutment surface at the end of the thread of said nut is concavely shaped to engage a side of said pin in surface contact.

5. In combination, a feed screw member having a rigid thread thereon, a nut member having a rigid thread therein threaded to said screw member, means supporting one of said members against axial movement, means supporting the other of said members for axial movement, means supporting one of said members against rotation, means supporting the other of said members for rotation, motor drive means connected to said last mentioned member for driving it in rotation, and means limiting relative axial movement between said members comprising abutment means on said members having abutment surfaces disposed generally transversely at a non-wedging angle to the direction of relative movement between said surfaces upon engagement, said motor drive means being adapted to stall when said surfaces are brought into engagement thereby preventing any possibility of jamming or frictional interlocking between the feed screw member and the nut member.

6. In combination, a feed screw member having a rigid thread thereon, a nut member having a rigid thread therein threaded to said screw member, means supporting one of said members against axial movement, means supporting the other of said members for axial movement, means supporting one of said members against rotation, means supporting the other of said members for rotation, motor drive means connected to said last mentioned member for driving it in rotation, and means limiting relative axial movement between said members comprising abutment means on said members comprising a pin extending diametrically through said screw member and extending radially outwardly therefrom at both ends, and a pair of surfaces at an end of said nut member including surface portions movable simultaneously into abutment with circumferentially facing side portions of the radially extending portions of said pins, the end portions of said nut in front of said surface portions being relieved on an angle substantially equal to the helix angle of the threads on said nut member, said motor drive means being adapted to stall when said surfaces are brought into engagement thereby preventing any possibility of jamming or frictional interlocking between the feed screw member and the nut member.

7. In combination, a feed screw member having a rigid thread thereon, a nut member having a rigid thread therein threaded to said screw member, means supporting one of said members against axial movement, means supporting the other of said members for axial movement, means supporting one of said members against rotation, means supporting the other of said members for rotation, motor drive means connected to said last mentioned member for driving it in rotation, and means limiting relative axial movement between said members comprising a fixed abutment located entirely within a thread space of said feed screw member and including a generally circumferentially facing abutment surface, said nut member having a thread shaped at one end to provide a generally circumferentially facing abutment surface engageable in non-jamming relation with the aforesaid abutment surface of said screw, said motor drive means being adapted to stall when said surfaces are brought into engagement thereby preventing any possibility of jamming or fractional interlocking between the feed screw member and the nut member.

References Cited in the file of this patent

UNITED STATES PATENTS

| | | |
|---|---|---|
| 742,173 | Dillon | Oct. 27, 1903 |
| 771,188 | Thompson | Sept. 27, 1904 |
| 1,579,847 | Struewing | Apr. 6, 1926 |
| 1,744,228 | Kaufmann | Jan. 21, 1930 |
| 2,290,899 | Stapelfeldt | July 28, 1942 |
| 2,417,434 | Mead et al. | Mar. 18, 1947 |
| 2,446,393 | Russell | Aug. 3, 1948 |
| 2,590,251 | Hoover | Mar. 25, 1952 |
| 2,714,821 | Orner | Aug. 9, 1955 |
| 2,857,776 | Williams | Oct. 28, 1958 |

FOREIGN PATENTS

| | | |
|---|---|---|
| 831,898 | France | Sept. 15, 1938 |
| 990,379 | France | Sept. 20, 1951 |